United States Patent [19]

Uchida

[11] 4,253,546
[45] Mar. 3, 1981

[54] HAND TRUCK

[76] Inventor: Taichi Uchida, 29 Kamibetto-cho, Kitashirakawa, Sakyo-ku, Kyoto-shi, Kyoto-fu, Japan

[21] Appl. No.: 22,231

[22] Filed: Mar. 20, 1979

[30] Foreign Application Priority Data

May 15, 1978 [JP] Japan .............................. 53/65385[U]
May 15, 1978 [JP] Japan .............................. 53/65386[U]

[51] Int. Cl.³ ............................................. B62B 1/12
[52] U.S. Cl. .................................. 182/20; 182/82; 280/30; 280/47.19
[58] Field of Search .................. 182/20, 21, 129, 127, 182/82; 280/30, 47.29, 47.28, 47.27, 47.18, 47.21

[56] References Cited

U.S. PATENT DOCUMENTS

| 1,341,171 | 5/1920 | Hall | 280/47.21 |
| 2,199,306 | 4/1940 | Earle | 280/47.28 |
| 2,907,402 | 10/1959 | Lewis | 182/206 |
| 3,430,972 | 3/1969 | Fiedler | 280/47.29 |
| 3,712,496 | 1/1973 | Miller | 280/47.27 |

Primary Examiner—Reinaldo P. Machado
Attorney, Agent, or Firm—Jordan and Hamburg

[57] ABSTRACT

A hand truck comprises a frame having handles at its rear end, wheels attached at least to the front end of the frame on opposite sides of its bottom, and a load support provided on the upper side of the frame and mounted on the frame shiftably longitudinally of the frame. Loads can be transferred from the truck, for example, to the bed of a light van positioned at some distance above the ground or from the bed to the truck by raising or turning down the truck on the principle of the lever, with the load support attached to the frame at a position corresponding to the level of the bed. The truck can be connected in a slanting position to the bed by a connector attached to the rear end of the frame to take loads from the vehicle along the truck as by a chute. The frame is foldable into two. The truck is usable also as a stepladder when the frame is held in an inverted V-shaped half-unfolded position by a holder.

20 Claims, 17 Drawing Figures

ID TRUCK

The present invention relates to hand trucks, and more particularly to hand trucks which are convenient for transferring a load from the truck, for example, to the bed of a light van positioned at some distance above the ground or from the bed to the hand truck.

Conventional hand trucks of this type comprise a frame having handles at its rear end, a pair of wheels attached to the front end of the frame on opposite sides of its bottom, and a load support attached to the front end of the frame on the upper side thereof. When such a hand truck is used for transferring a load from the truck to the bed of a light van or automotive truck which bed is positioned at some distance above the ground or from the bed to the hand truck, the load must be lowered to the hand truck or raised to the bed by hand. The hand truck has the drawback that the load is extremely difficult to handle or requires much labor when it is heavy.

An object of this invention is to provide a hand truck which is free of the above-mentioned drawback and which enables the user to transfer loads between the hand truck and the bed for example of a light van with extreme ease and small force by raising or turning down the truck.

Another object of this invention is to provide a hand truck which is not equipped with any complex lift means but has an exceedingly simple construction and which nevertheless facilitates the transfer of loads in the manner described above.

Another object of this invention is to provide a hand truck which is connectable in an inclined position for example to the bed of a light van for transferring loads as with a chute and which assures the transfer of loads with greater convenience.

Still another object of this invention is to provide a hand truck which is useable also as a stepladder when so desired.

Other objects and advantages of this invention will become apparent from the following description of embodiments with reference to the accompanying drawings, in which.

With reference to FIGS. 1 to 7, the frame 1 of a hand truck comprises a pair of side bars 2 formed of square pipe or the like and a suitable number of lateral members 3 and 4 interconnecting the side bars 2. The side bars 2 have rear end portions suitably bent downward to provide handles 5 for carrying a load. To render the frame 1 foldable and usable also as a stepladder, each of the side bars 2 comprises a front half portion 2a and a rear half portion 2b which are separate from each other but connected together foldably by joint pieces 6a, 6b and a pivot 7 at the middle of the frame longitudinally thereof. A holding bar 8 is pivoted for example to the joint piece 6b on the side bar rear half portion 2b. Engaging pins 9 and 10 are provided for example on the joint piece 6a on the side bar front half portion 2a for engaging the free end of the holding bar 8 to hold the frame 1 in its stretched position and in an inverted V-shaped half-unfolded position respectively. The holding bar 8 and the engaging pins 9, 10 are suitably shaped and arranged so that the frame 1 retains its posture free of any inadvertent changes when raising, lowering or carrying a load in its stretched position and when in its half-unfolded position for use as a stepladder. When desired, the truck may be provided with suitable locking means for holding the truck in each of these positions. The lateral members 3 positioned near the midportion of the frame 1 serve as a top plate when the truck is used as a stepladder, with the other lateral members 4 serving as steps. The lateral members 3 and 4 are arranged suitably for this purpose.

Figure 1:
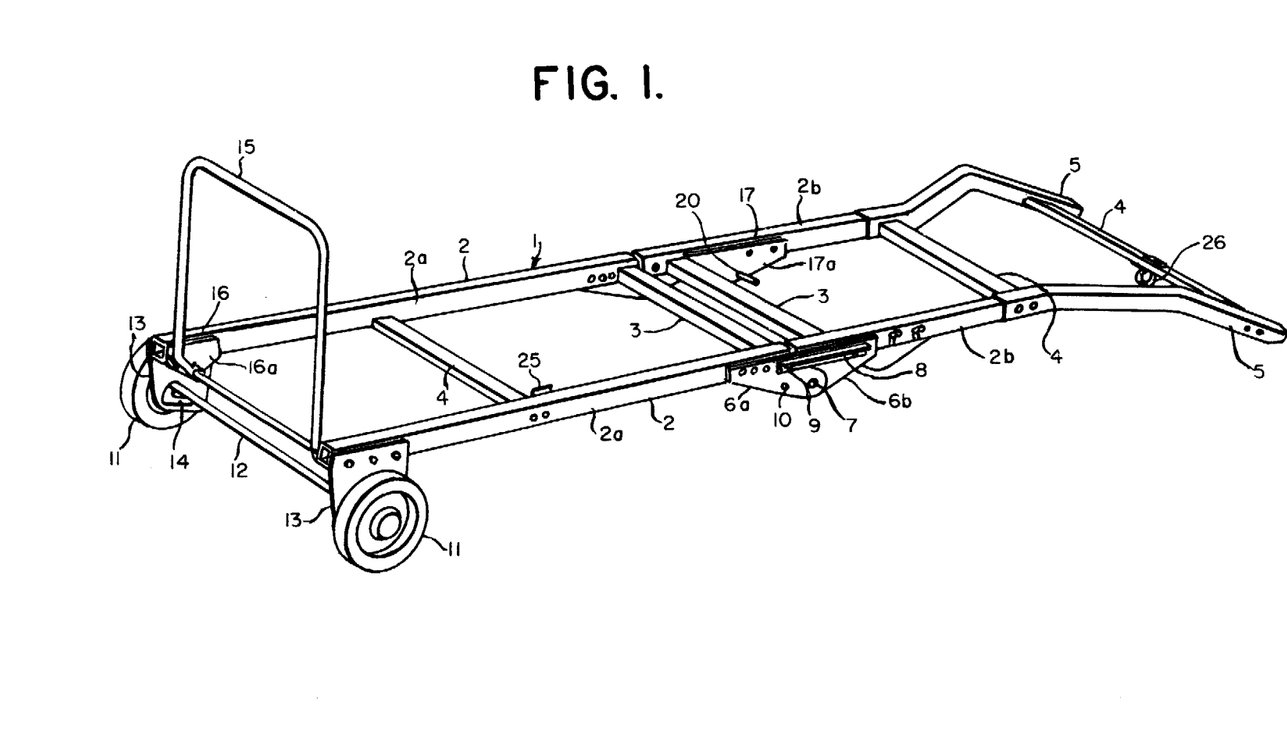
FIG. 1 is a perspective view showing a hand truck of this invention.

A pair of wheels 11 are mounted on an axle 12 on brackets 13 extending downward from the frame 1 at opposite sides of its front end. The brackets 13 are each formed with a slot 14 of bent shape with the axle 12 extending therethrough to render the wheels 11 and axle 12 shiftable so that the truck is usable as a stepladder free of any trouble.

Figure 2:
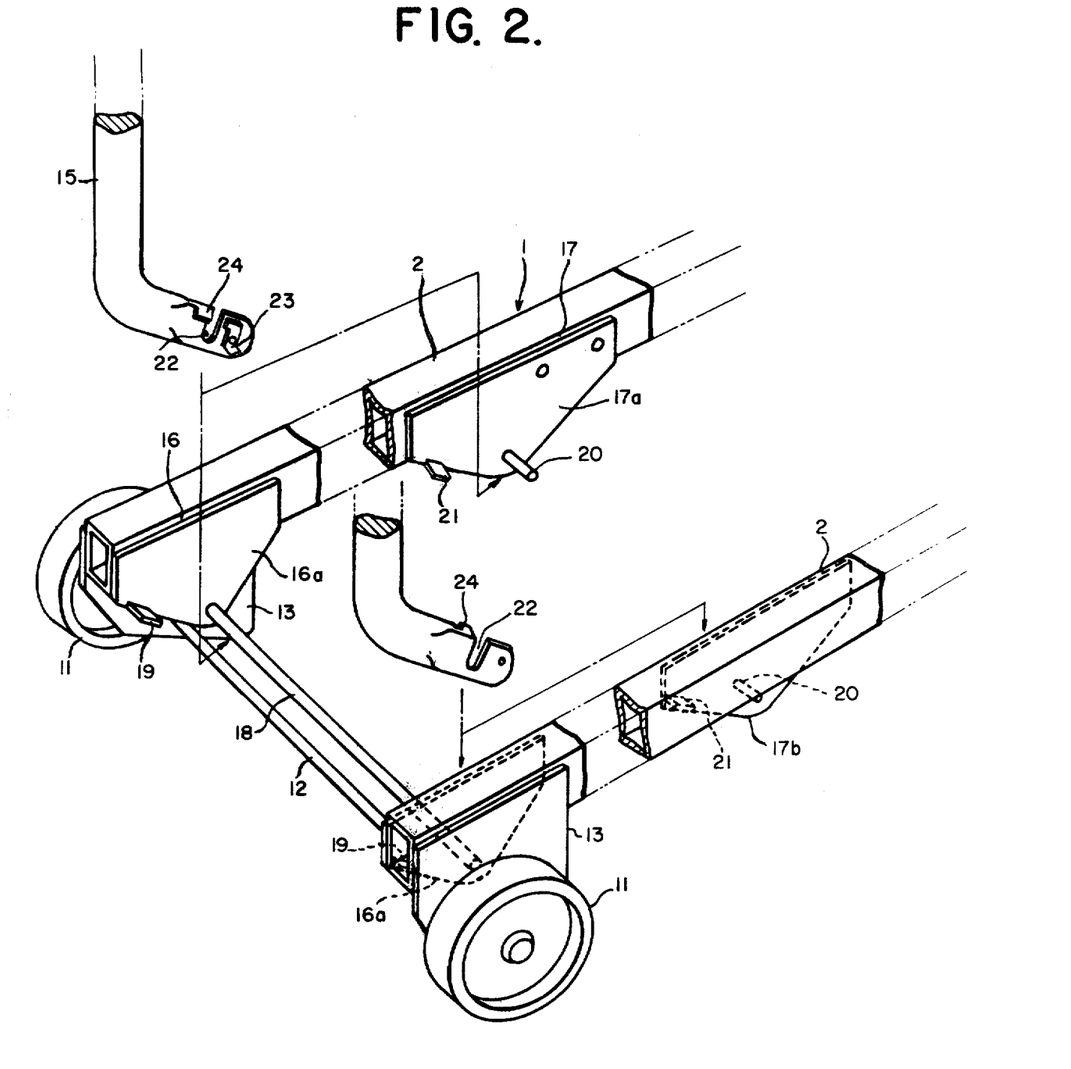
FIG. 2 is an enlarged exploded perspective view partly broken away and showing portions for attaching a load support.
Figure 3:
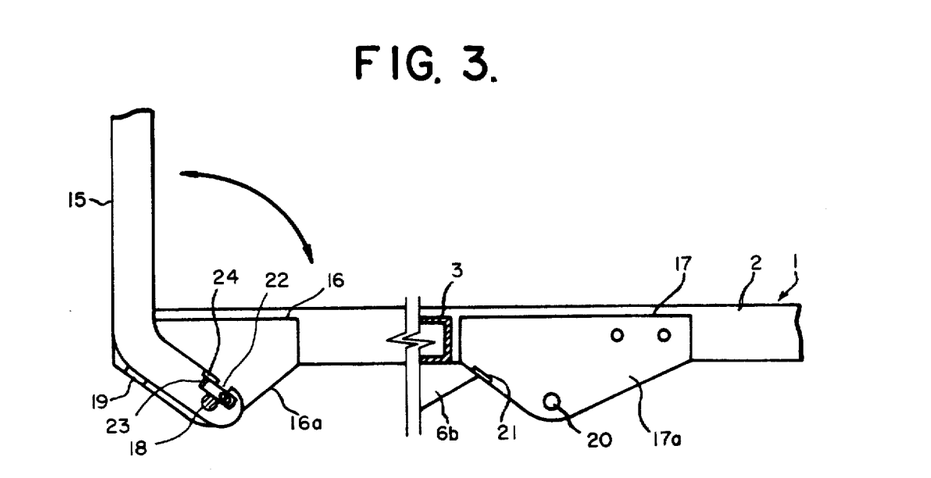
FIG. 3 is an enlarged view in vertical section partly broken away to show the load support as mounted in place.

A load support 15 is attached to the frame 1 shiftably longitudinally of the frame 1. Especially with the present embodiment, the load support 15 is detachably, selectively and turnably fitted to one of attaching portions 16 and 17 provided on the front end and an intermediate suitable portion of the frame 1. Stated more specifically the attaching portion 16 at the front end of the frame 1 comprises brackets 16a attached to the side bars 2 on their inner faces, a rod 18 interconnecting the brackets 16a and also reinforcing the frame 1, and stoppers 19 projecting from the brackets 16a for holding the load support 15 in an upright position at a specified location. The attaching portion 17 at the intermediate portion of the frame 1 comprises brackets 17a, rods 20 and stoppers 21. The attaching portion 17 is disposed at such a position that the distance from the front end of the frame 1 to the attaching portion 17 corresponds to the height for example of the bed of a light van. The load support 15 is in the form of a frame flexed at an obtuse angle close to its opposite bade ends. Each of the base ends has a rod fitting portion 22 provided by a cutout extending obliquely upward. The fitting portion 22 is provided at its open end with a holding piece 23 for pivotally closing the opening when the fitting portion 22 is in engagement with the rod 18 or 20. An engaging portion 24 is provided for the holding piece 23. An elastic holding piece 25 is attached to the inner face of the side bar 2 of the frame 1 for holding the load support 15 in its turned down position. Although the illustrated embodiment has two load support attaching portions 16 and 17 at the front end and intermediate portion of the frame 1, a suitable number of such attaching portions may be additionally provided at other portions to render the hand truck usable for loading and unloading trucks, light vans and the like having beds at varying levels.

The means for detachably turnably fitting the load support 15 to the attaching portions 16 and 17 may be designed variously. Although not shown, the rod fitting portion of the support 15 may be so shaped as to have a circular hole and a groovelike cutout of reduced width communicating with the hole and opened toward a specified direction, while the rod on the attaching portion may be a round rod which is partially cut out to have a width in conformity with the cutout, so that the fitting portion is engageable with or disengageable from the rod only when the load support is inclined to a predetermined angle. The support can then be prevented from inadvertently slipping off while in its upright or turned-down position without using the aforementioned holding piece 23. Although the attaching portions 16 and 17 in the illustrated embodiment are provided with the rods 18 and 20 in combination with the fitting portions 22 of the support 15, the support may be provided with rods extending laterally outward from its base ends for engagement with rod fi ing portions formed in the attaching portions.

Figure 4:
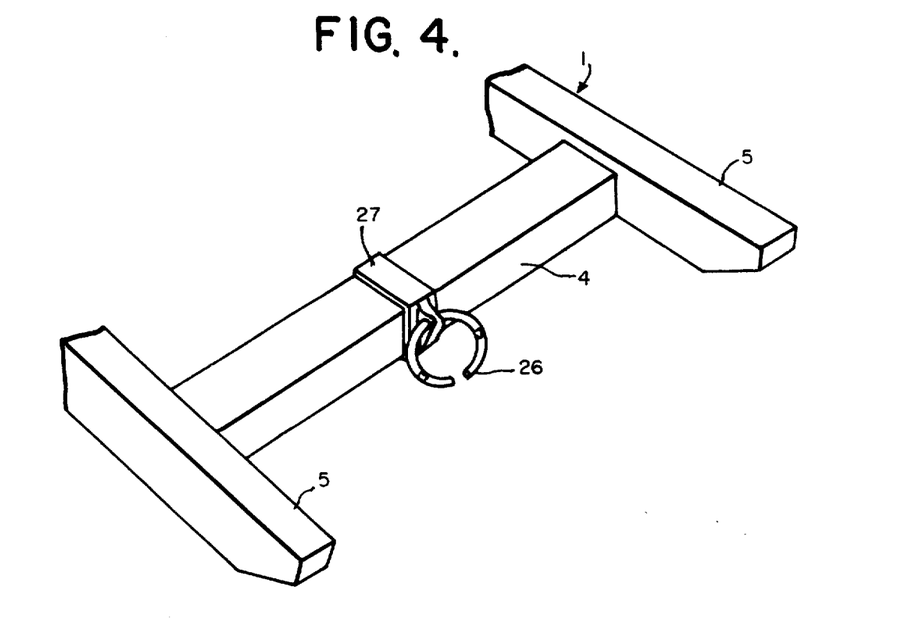
FIG. 4 is an enlarged perspective view showing a connector as attached to the frame of the truck.
Figure 5:
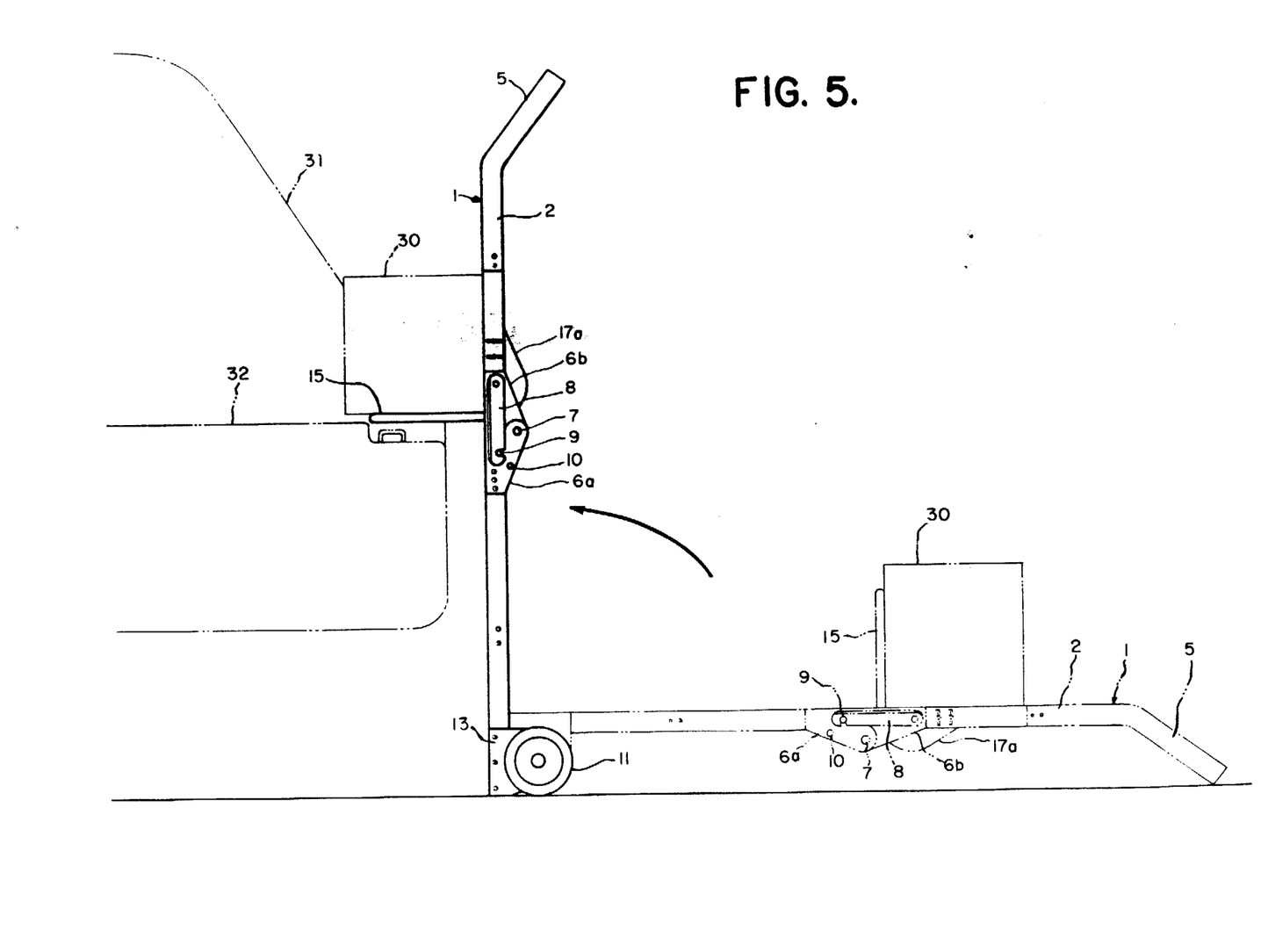
FIG. 5 is a side elevation showing the hand truck while in use for transferring a load to a light van.

Indicated at 26 is a connector for attaching the hand truck to the bed of a light van or the like. The connector 26 is attached by a suitable member 27 to the rearmost lateral memer 4 of the frame 1. The connector is in the form of a partly cut out open ring and is detachably connectable to a locking member 33 disposed close to the rear end of the bed of the light van for the rear door thereof as will be described later. The opposed ends of the connector 26 at its opening may be inwardly bent to prevent the connector 26 from inadvertently slipping off. The connector 26 may further be attached to the frame 1 by a suitable member shiftably longitudinally of the frame and thereby made adjustingly positionable toward or away from the vehicle to which it is to be attached, in accordance with the type of the vehicle. Also usable as such a connector for engagement with the locking member on the vehicle is a ring having an elastically closable opening.

When the hand truck described above is used for carrying loads in the usual manner, the load support 15 is fitted to the front end attaching portion 16 of the frame 1 in its upright position relative to the frame 1. Stated more specifically, the fitting portions 22 of the support 15 at the base ends are engaged with the rod 18, and the support 15 is thereafter turned to its upright position into engagement with the stoppers 19, whereby the support 15 is held in this position. In the same manner as with conventional hand trucks, the load is placed on the frame 1 as supported by the support 15, and the truck is pushed forward by the handles 5 with the wheels 11 in contact with the ground.

The load 30 on the hand truck will be transferred for example to the bed 32 of a light van 31 in the following manner. As indicated in phantom lines in FIG. 5, the hand truck is turned down to its horizontal position behind the light van 31. The load support 15 is removed from the front end attaching portion 16 and fitted to the intermediate attaching portion 17 in the same manner as when it is attached to the portion 16, causing the support 15 to support the load 30 on the frame 1. When this procedure is to be followed subsequent to the transport of the load, the load 30 may be shifted from the front end rearward along the frame 1 before the replacement of the support 15 to facilitate the procedure. The hand truck is thereafter raised to the solid-line position in FIG. 5 by the hands grasping the rear end handles 5 of the frame 1, with the frame front end serving as a fulcrum and the frame as a lever, to lift the load 30 to the level of the bed 32 and transfer the load onto the bed 32. In this way, the load can be transferred with an exceedingly smaller force than when it is raised directly by hand.

Figure 6:
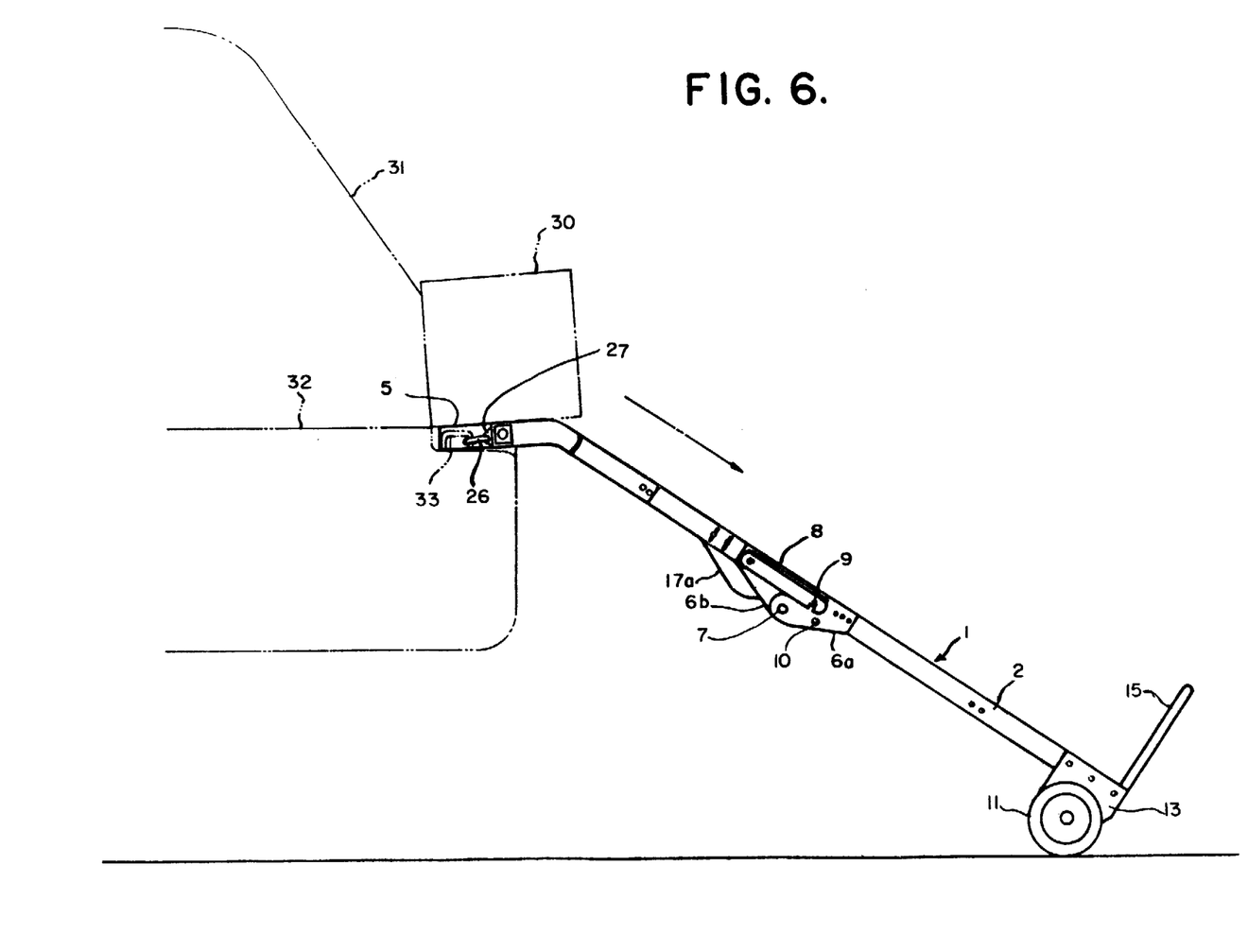
FIG. 6 is a side elevation showing the hand truck as attached to a light van by the connector for taking a load from the van.

The load 30 can be taken down from the bed 32 of the light van 31 in a manner reverse to the above similarly with great ease, while the connector 26 is useful for discharging the load 30 with use of the hand truck as a chute, with the support 15 held in its upright position to the attaching portion 16 at the front end of the frame 1. In this case, the connector 26 is engaged with the rear door locking member 33 disposed close to the rear end of the bed 32 of the light van 31 to connect the hand truck to the bed 32 in an inclined position. With the hand truck thus positioned, the load 30 on the bed 32, if brought to the rear end of the frame 1, can be slidingly lowered along the sloping frame 1 by gravity. When it is desired to bring the load 30 from the bed 32 directly down to the ground, the support 15 may be held folded on the frame 1 or removed therefrom.

Figure 7:
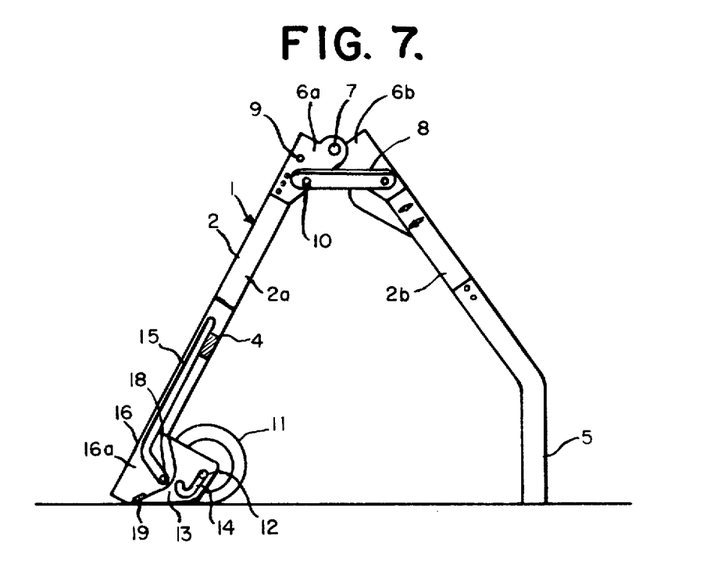
FIG. 7 is a side elevation showing the hand truck in use as a stepladder.

The hand truck is usable also as a stepladder when held substantially in an inverted V-shaped half-unfolded or half-folded position by the engagement of the holding bars 8 with the engaging pins 10 as shown in FIG. 7. In this position, the front half portions 2a and the rear half portions 2b of the side bars 2 extend upward on the ground or floor, with the lateral members 3 and 4 serving as the top plate and steps of the step-ladder. In this case, the front half portions 2a bear on the floor at the frame front end with the axle 12 shifted along the slots 14 and the wheels 11 in a displaced position to permit the bearing contact of the front end with the floor.

The load support 15 is turned down onto the frame 1 or removed from the frame 1 when the hand truck is used as a stepladder or left out of use in its folded state. The support 15 then will not make the truck bulky or become a hindrance.

The means for holding the frame 1 substantially in its inverted V-shaped half-unfolded position to make the hand truck usable as a stepladder is provided on the joint between the front half portion and rear half portion of each side bar in the illustrated embodiment, whereas, the holding means may be provided between an opposed pair of lateral members in the middle of the width of the frame 1. Furthermore the arrangement for rendering the axle 12 movable in the range of the slots 14 may include coil springs (not shown) interconnecting suitable portions of the axle 12 and of brackets 13 so that the axle 12 can be elastically retained at the front ends of the slots 14 and also at the rear ends of the slots.

Figure 8:
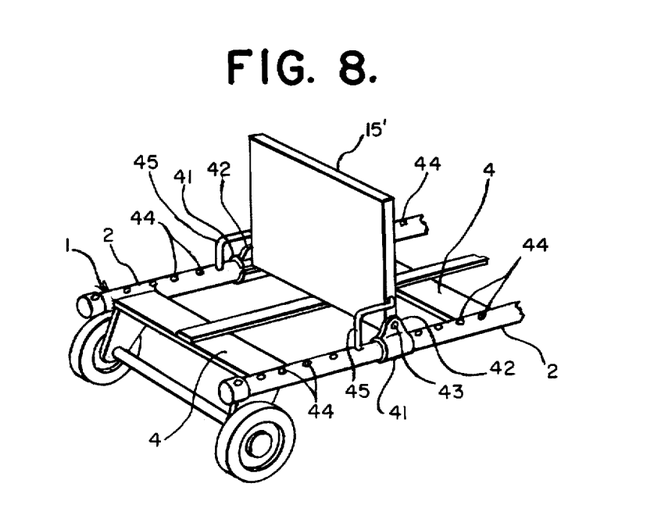
FIG. 8 is a fragmentary perspective view showing another embodiment of the load support attaching portion.
Figure 9:
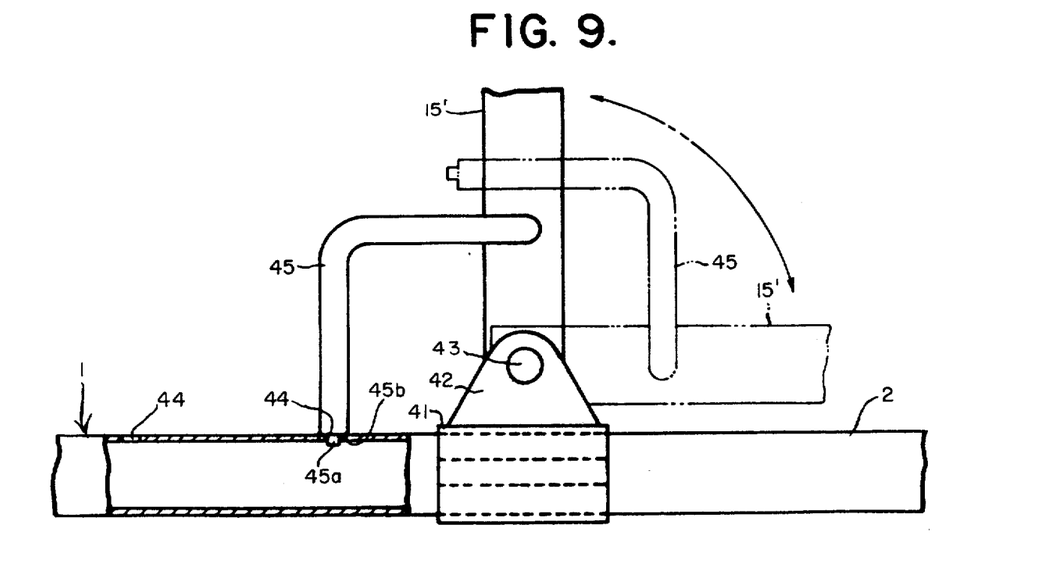
FIG. 9 is an enlarged view in vertical section showing the same.
Figure 10:
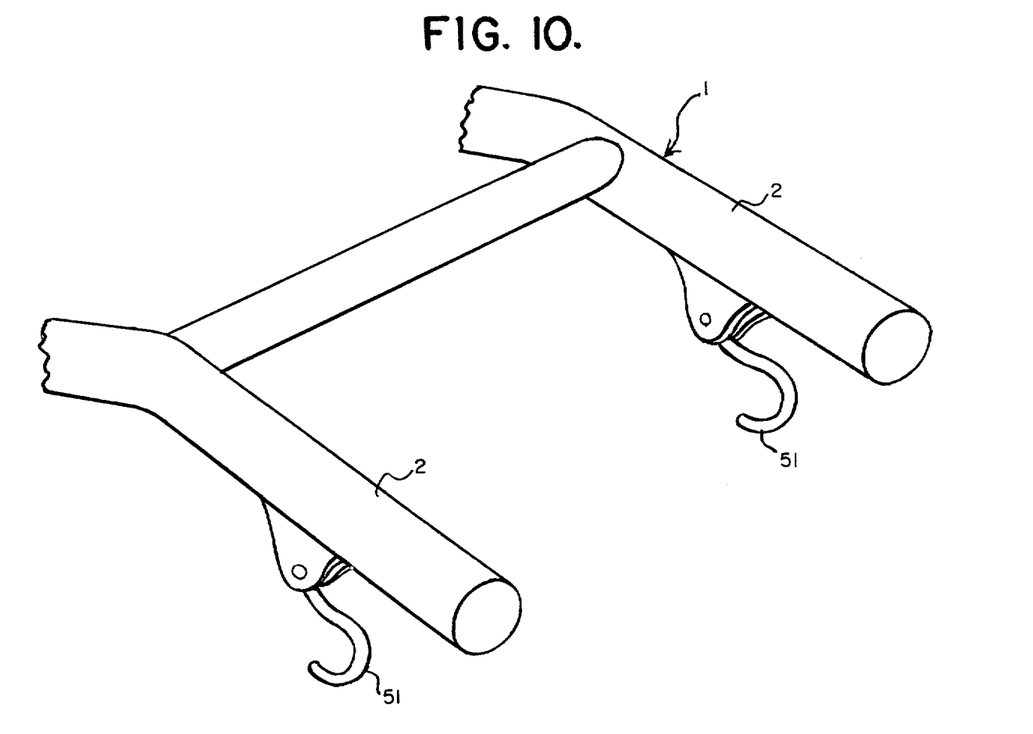
FIG. 10 is a fragmentary perspective view on an enlarged scale showing another embodiment of the connector.

FIGS. 8 and 9 show a load support 15' which is shiftably mounted on the frame 1 by attaching members 41 which are slidable on the frame 1 longitudinally thereof. More specifically stated, the attaching members 41 are in the form of a short tube and slidably fitted around the side bars 2 respectively. The load support 15' is tiltably mounted on projections 42 on the attaching members 41 by pins 43 projecting from opposite sides of the support 15'. Means for locking the support 15' in a desired position comprises a number of holes 44 formed in the upper surface of each side bar 2 and arranged longitudinally thereof at specified spacing, and a flexed holding rod 45 projecting from each side of the support 15'. With the support 15' positioned at a right angle with the side bar 2, the holding rod 45 is engageable in one of the holes 44. The inside portion of each attaching member 41 is formed with a longitudinal cutout of given width so as to be slidable without interfering with the lateral members 4. For the engagement of the holding rod 45 in the hole 44, the hole 44, for example, extends through the upper wall of the bar 2, while the holding rod 45 has a free end 45a having a reduced diameter which is smaller than the diameter of the hole 44, with the other portion of the rod 45 having a larger diameter than the hole 44 to provide a stepped portion 45b. When the support 15' is positioned upright relative to the frame 1, the free end 45a of the holding rod 45 engages in the hole 44 with the stepped portion 45b bearing on the outer surface of the side bar 2. Alternatively the hole 44 may be replaced by a cavity.

When the support 15' is in a tilted or turned-down position, the holding rod 45 is out of engagement with the bored portion 44, rendering the support 15' free to move, whereas when the support 15' is raised at a desired position, the holding rod 45 engages in the hole 44 to lock the support 15' in this position.

In place of the annular connector 26, the connectors to be described below are also usable for coupling the hand truck for example to the bed of a light van.

Figure 11:
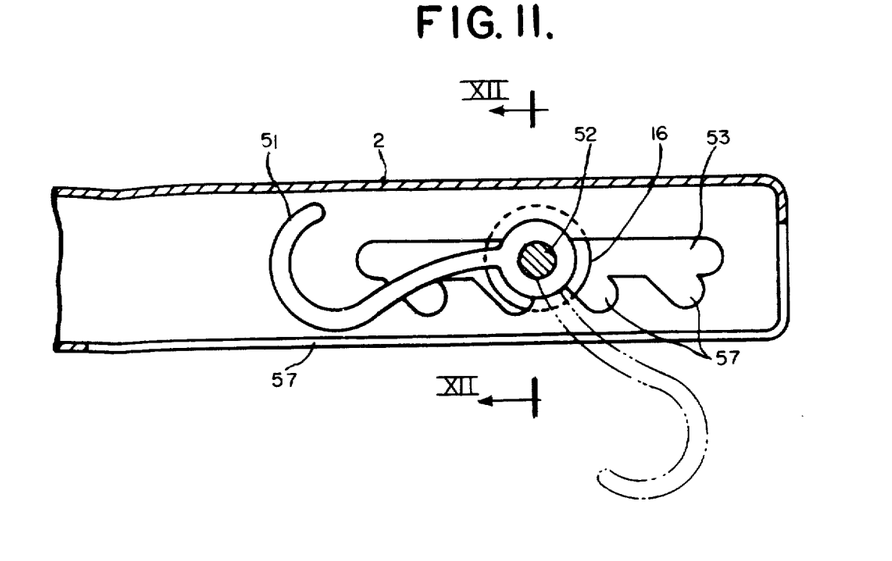
FIG. 11 is a fragmentary perspective view on an enlarged scale showing another embodiment of the connector.

FIG. 11 shows a connector 51 in the form of a hook extending outward from the bottom of the frame 1 near its rear end, for example, from the bottom of each side bar 2. The connector 51 may fixedly project from the frame 1 but is preferably pivotably attached to the frame 1 so as to be easier to use for connection and removal as illustrated.

Figure 12:
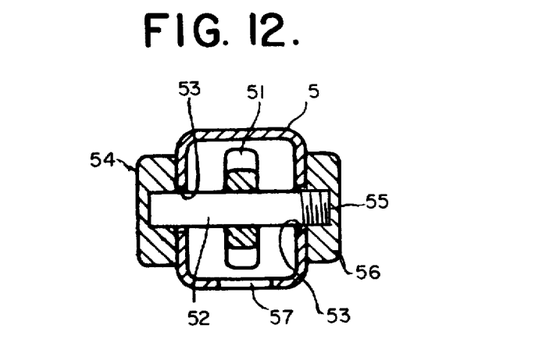
FIG. 12 is a view in section taken along the line XII—XII in FIG. 11.

Further with reference to FIGS. 11 and 12, the hook-shaped connector 51 is retractable into the side bar 2 so as not to become a hindrance while not in use and is adjustingly shiftable longitudinally of the side bar 2 in accordance with the location to which the hand truck is to be coupled. More specifically stated, the base portion of the connector 51 is fixedly mounted, within the side bar 2, on a turnable lateral pin 52 extending through slots 53 formed in opposite sides of the side bar 2. The lateral pin 12 has one end fixedly carrying a knob 54 for turning the pin 12 and the other end externally threaded as at 55. A fastening member 56 resembling a cap nut is screwed on the threaded end 55. A slot 57 through which the connector 51 is brought out from or into the side bar 2 is formed in the bottom and rear end wall of the side bar 2 to extend over a specified range. The lateral pin 52, when turned by the knob 54, turns the connector 51 out from or into the side bar through the slot 57. The connector 51 is shiftable with the lateral pin 52 by the knob 52 over the range defined by the slots 53 in opposite sides of the side bar 2. The fastening member 56 locks the connector 51 when tightened up. In order to make the connector 51 more effectively lockable against any displacement, one edge of the side bar wall defining each slot 53 is formed with a number of recesses 57 spaced apart by a given distance and communicating with the slot 53 so that the lateral pin 52 can be locked in the desired position as engaged in a recess 57.

Figure 13:
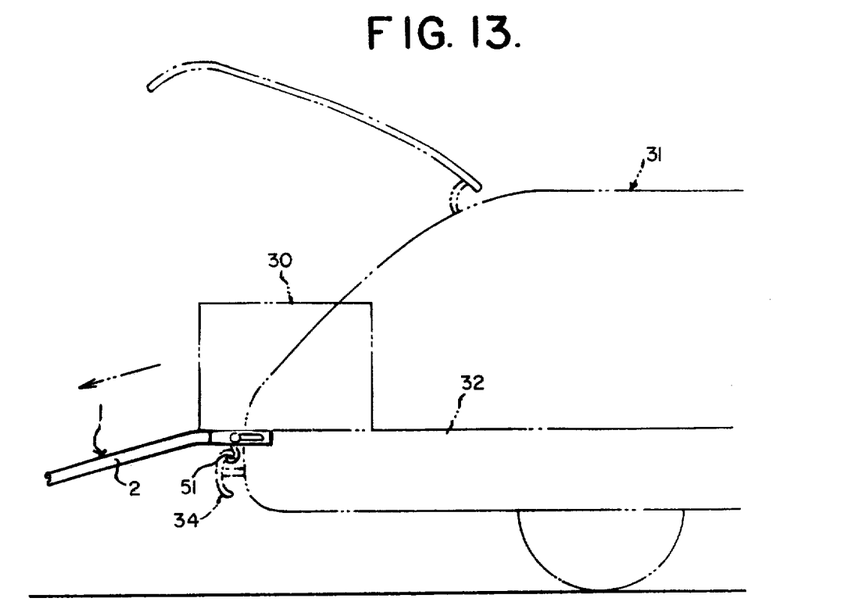
FIG. 13 is a fragmentary schematic side elevation showing a mode in which the connector is used.
Figure 14:
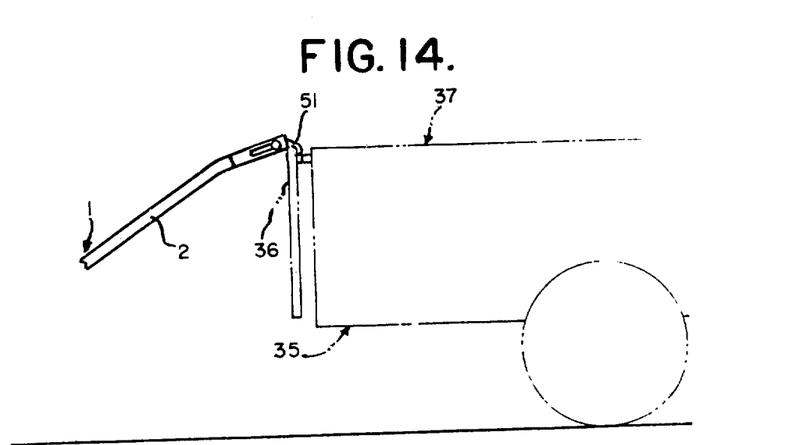
FIG. 14 is a fragmentary schematic side elevation showing another mode in which the connector is used.

The hook-shaped connectors 51 are used for transferring loads by the hand truck as by a chute. For example for use with the light van shown in FIG. 13, the connectors 51 are engaged with the rear bumper 34 of the van 31 to couple the hand truck to the van 31 in a sloping position. Further when a truck is to be unloaded as seen in FIG. 14, the rear wall 36 of the truck 35 is opened, and the connectors 51 are engaged with an edge of the wall 36, whereby the hand truck can be similarly coupled to the truck 35 in a slanting position, with the result that loads can be slidingly taken from the bed 37 of the truck.

Figure 15:
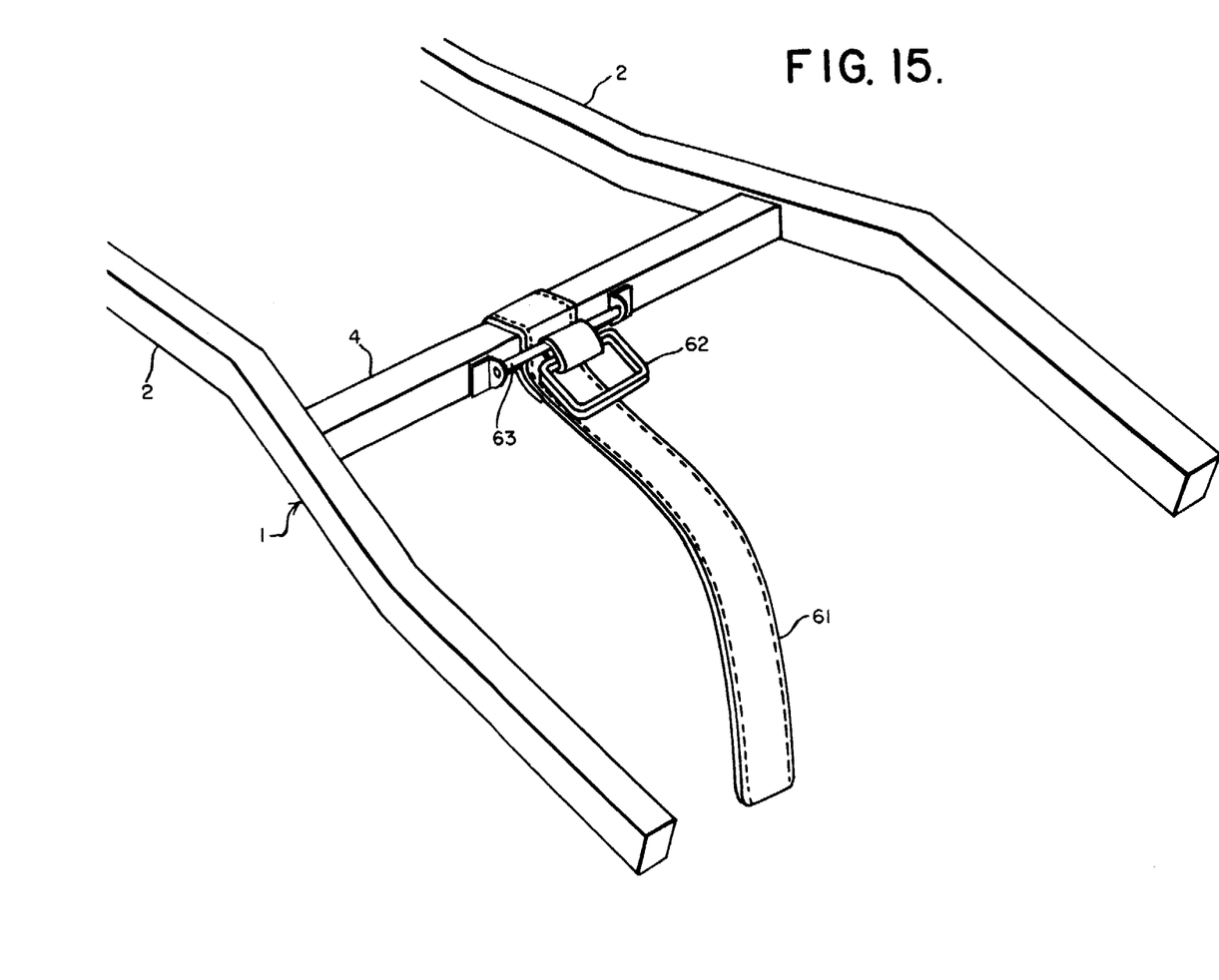
FIG. 15 is a fragmentary perspective view on an enlarged scale showing another embodiment of the connector.
Figure 16:
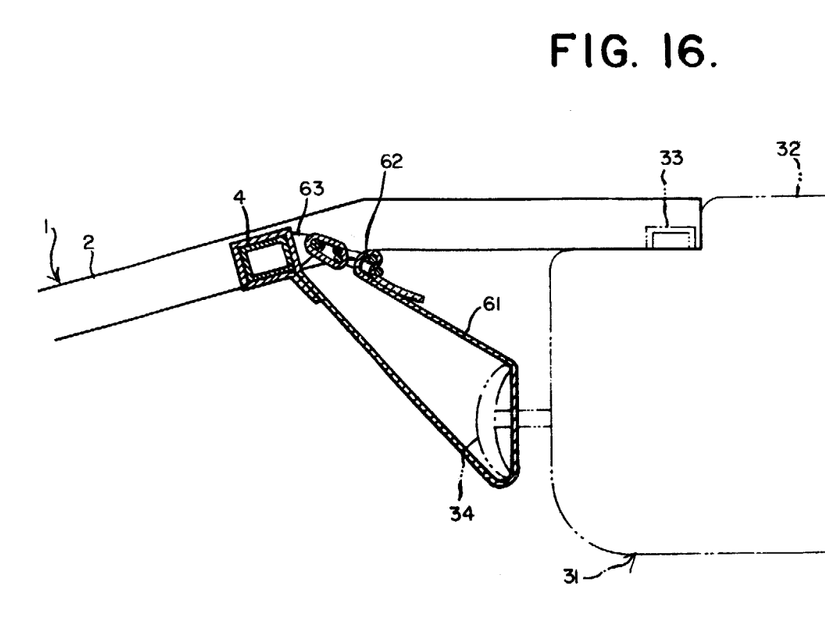
FIG. 16 is a fragmentary enlarged view in section showing the hand truck as attached to a light van by the connector.

FIGS. 15 to 16 show a flexible belt 61 serving as a connector and attached to the rearmost lateral member 4 of the frame 1 at its one end wound around the member 4 with its exremity stitched to a portion of the belt opposed thereto. A fastening member for detachably fastening the free end of the belt 61 is attached by a member 63 to the rearmost lateral member 4 of the frame 1. Although the fastening member 62 of the illustrated embodiment comprises a pair of substantially square rings, various other fastening means already known are usable as desired.

The hand truck is connected for example to the light van 31 shown in FIG. 16 with the belt 61 by passing the belt 61 around the rear bumper 34 of the van or winding the belt 61 around the bumper 34 one to several turns and thereafter engaging the free end of the belt 61 to the fastening member 62. Alternatively the belt 61 may be attached to the locking member 33 on the rear end of the bed 32 by being passed therethrough or wound therearound. The belt 61 is convenient to use in that it can be attached to a suitable projection or bar on light vans, automotive trucks or the like.

Figure 17:
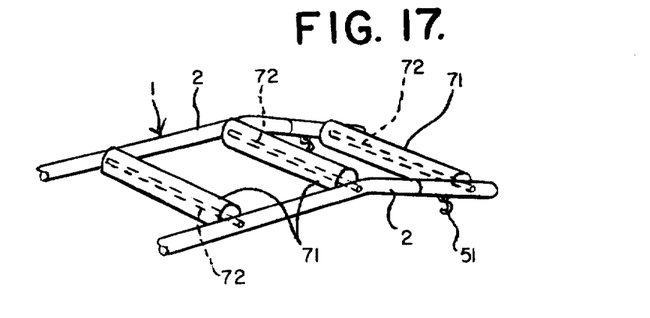
FIG. 17 is a fragmentary perspective view showing load transfer rollers as mounted on the hand truck and adapted for use with the connector.

FIG. 17 shows rollers 17 mounted on several portions of the frame 1 and adapted for conjoint use with the arrangement including a connector for transferring loads in the mode of a chute, so as to render the load movable with improved smoothness. The rollers 71 are freely rotatably on several shafts 72 spaced apart by a given distance longitudinally of the frame 1 and provided also as lateral members or independently of the lateral members. The rollers 71, although extending approximately over the entire width of the frame 1 in the illustrated embodiment, may be provided partially as at opposite sides of the frame. Further although the rollers 71 are illustrated in combination with the hook-shaped connectors 51, they can of course be used as combined with the connector 26 or 61 described. Needless to say, the rollers 71 are arranged not to interfere with the means already described for rendering the support 15 or 15' shiftable.

The rotation of the rollers 71 renders loads smoothly transferrable as on a chute by the hand truck attached in a sloping position to the bed of a light van, truck or the like.

As already described, loads can be placed onto the bed of a light van or automotive truck positioned at some distance above the ground with extreme ease by a small force according to the principle of the lever, by placing the load on the hand truck of this invention in its substantially horizontal turned-down position with the support mounted in place and raising the frame by the rear end handles. Further in a manner reverse to the above, loads can be lowered from an elevated position with ease. The connector in the form of a partially open ring, hook or belt, if attached to the frame near the rear end thereof, is useful for connecting the hand truck to a light van or the like in a slanting position and taking loads from the vehicle along the hand truck as by a chute. With the selective use of such means and the means for shiftably using the load support, loads can be transferred very easily. The hand truck is serviceable also as a stepladder because the frame is foldable into two and equipped with means for locking the frame in an inverted V-shaped half-unfolded position. The load support will not become a hindrance since it can be turned down onto the frame or is removable therefrom when the hand truck is used as a stepladder or is not put to use.

Thus the hand truck of this invention is very useful with various advantages.

What is claimed is:

1. A hand truck comprising a frame having longitudinally extending and transversely spaced side members, wheels rotatably mounted at one end of said frame, handle means at the other end of said frame, a load support member, and mounting means on said side members for mounting said load support member at selected longitudinally spaced locations of said frame, said mounting means comprising bracket supports which are operable to engage and mount said load support member so that the latter extends generally perpendicularly from said side members such that when the hand truck is disposed in a substantially upright position, loads may be carried on the hand truck at different elevations as determined by the selected location on which said load support member is mounted on said bracket supports.

2. A hand truck according to claim 1 wherein one pair of bracket supports are provided substantially at one longitudinal end of said side members and another pair of bracket supports are provided at an intermediate position along the longitudinal length of said side members, said intermediate position being located so that when a load is located on the load support member which is mounted on said bracket support in said intermediate position and when said hand truck is pivoted from a generally horizontal disposition to a generally vertical disposition, said load will be raised by said pivotal movement of said hand truck for off-loading at an elevated position.

3. A hand truck according to claim 1 wherein said bracket supports mount said load support member for pivotal movement between said position where the load support member extends substantially perpendicular to said side members and a position where said load support member extends substantially parallel to said side members.

4. A hand truck according to claim 3 wherein said bracket support comprises a lateral rod element and a lateral stop member, said load support member having a receiving opening for receiving said rod element such that the load support member is pivotal about the axis of said rod element between said two positions, said stop member being located to engage said load support member when the latter is in said position extending substantially perpendicular to said side members.

5. A hand truck according to claim 4 wherein said load support member has mounting extensions on which said receiving openings are disposed, said mounting extensions being disposed at an obtuse angle relative to the general plane of said load support member.

6. A hand truck according to claim 5 wherein said receiving openings are formed as slots, and further comprising means mounted on said mounting extensions for closing off an end portion of said slot to thereby retain said rod element within said slot.

7. A hand truck according to claim 1 wherein said bracket supports detachably mount said load support member on said side members.

8. A hand truck according to claim 1 further comrising means on said side member engaging said load support member for securing the latter in said position generally parallel to said side member.

9. A hand truck according to claim 1, including a connector member carried by said frame for releasably connecting one end of the hand truck to the bed of a motorvehicle whereby said frame is usable as a chute.

10. A hand truck according to claim 1, including a series of longitudinally spaced holes formed in each of said side members, said bracket supports comprises sleeve members on said load support member slidable along the respective side members of said frame, and pin members on said load support member positionable selectively in said holes for securing the load support member in a desired position relative to said frame.

11. A hand truck according to claim 10, wherein said load support member is pivotably carried by said sleeve members to be pivotable between a first load-carrying position in which it extends generally perpendicularly to said side members and a second position in which it extends substantially parallel to said side members.

12. A hand truck according to claim 1, including a connector member carried by said frame for releasably connecting one end of the hand truck to the bed of a motorvehicle.

13. A hand truck according to claim 12, wherein a plurality of transversely extending load-bearing rollers are mounted in said frame at longitudinally spaced locations thereof.

14. A hand truck according to claim 12, wherein said connector comprises a ring-like member which is discontinuous.

15. A hand truck according to claim 12, wherein said connector comprises at least one hook member.

16. A hand truck according to claim 12, wherein said connector comprises a belt having one end thereof secured to said frame, and including means on said frame for receiving the free end of said belt in releasably locking relations therewith.

17. A hand truck according to claim 1, wherein said frame comprises first and second sections pivotably connected at substantially the longitudinal mid-point of said frame, a plurality of transversely extending members being connected between said side members, latching means on said frame operable to secure said first and second sections in a pivoted inverted V-shaped configurations such that the hand truck is usable as a step ladder, said transversely extending members being so positioned longitudinally of said frame that one can serve as a top plate for the step ladder and the others as the steps thereof.

18. A hand truck according to claim 17, including a second bracket secured to each of the opposed sides of the frame at said one end thereof, said second brackets each having a slot formed therein dimensioned to rotatably receive one end of an axle for said wheel means, said slots being so configured that when the axle is positioned therewithin adjacent one extremity thereof the hand truck is rollable on the wheel means whereas when the axle is positioned adjacent the other extremity thereof the wheel means are shifted to a position enabling said one end of the frame to rest non-rollably on the support surface therefor when the truck is used as a step ladder in its inverted V-shaped configuration.

19. A hand truck according to claim 18, wherein said slots in the said second brackets have a substantially J-shaped confirguration.

20. A hand truck comprising a frame having longitudinally extending and transversely spaced side members, wheels rotatably mounted at one end of said frame, a handle means at the other end of said frame, a load support member, mounting means on said side members for mounting said load support member at selected longitudinally spaced locations of said frame, said mounting means comprising bracket supports which are operable to engage and mount said load support member for pivotal movement between one position where the load support member extends substantially perpendicular to said side members and another position where said load support member extends substantially parallel to said side members, one pair of said bracket supports being provided substantially at one longitudinal end of said side members and another pair of bracket supports being provided at an intermediate position along the longitudinal length of said side members, said intermediate position being located so that when a load is located on the load support member which is mounted on said bracket support in said intermediate position and when said hand truck is pivoted from a generally horizontal disposition to a generally vertical disposition, said load will be raised by said pivotal movement of said hand truck for off-loading at an elevated position, said frame further comprising pivotal means pivotably connecting first and second sections of said frame at an intermediate longitudinal location of said frame, a plurality of transversely extending members being connected between said side members, and latching means on said frame operable to secure said first and second sections in a pivoted inverted V-shaped configuration such that the hand truck is usable as a step ladder.

* * * * *